United States Patent Office 3,347,744
Patented Oct. 17, 1967

3,347,744
MAGNESIUM HYDROXIDE SUSPENSIONS
Wilmer E. Latshaw, Berwyn, and Walter Wizerkaniuk, Lafayette Hill, Pa., assignors to Smith Kline & French Laboratories, Philadelphia, Pa., a corporation of Pennsylvania
No Drawing. Filed Oct. 25, 1963, Ser. No. 318,796
3 Claims. (Cl. 167—55)

This invention relates to liquid pharmaceutical preparations, more specifically to aqueous pharmaceutical suspensions having antacid and laxative properties and containing a high concentration of magnesium hydroxide.

Therapeutically magnesium hydroxide is used as an alkaline mouth wash, antacid and mild laxative. It is commercially available in tablet form and as a magma, i.e., a milk of magnesia. The most popular dosage form is the milk of magnesia. However, there are many disadvantages associated with this dosage form. The viscosity coupled with the earthy, chalky taste of the magma magnesia makes it very unpalatable and objectionable to ingest. One of the main disadvantages to the use of milk of magnesia is the quantity that must be taken to get a laxative effect, i.e., the bulk dosage necessary. For example, the recommended laxative adult dose is from two to four tablespoonfuls.

A further disadvantage is that commercially available milk of magnesia which is an aqueous suspension containing from about 7% to about 9% of magnesium hydroxide has a tendency to coagulate and clump upon standing. This characteristic is particularly evident when the product is allowed to freeze and eventually thaw. Freezing results in a more dense precipitate or flocculation. Upon thawing a clear water stratum separates on top of the bottle. The magnesium hydroxide cannot be readily redispersed upon shaking thus making the product unfit for further use. Furthermore, freezing of commercial milk of magnesia has resulted in the breaking of the glass containers. It is because of this very poor stability with freezing temperatures that the U.S. Pharmacopeia cautions "avoid freezing" and the commercial labeling requires "Do Not Freeze" warnings.

Unexpectedly the preparation of this invention provides for a much more concentrated form of milk of magnesia than has been previously available. The preparation in accordance with this invention can contain as high as 30% magnesium hydroxide which represents a three fold increase in concentration over the USP and commercially available magmas which contain from 7% to 8.5% magnesium hydroxide. The novel pharmaceutical preparation of this invention is unique in that it is not only much more concentrated than the USP or commercially available milk of magnesia but it is also more stable and palatable. The aqueous suspension as disclosed hereinafter can be frozen and then redispersed after thawing without any difficulty. Furthermore, the milk of magnesia suspension of this invention has improved palatability and is free of the earthy, gritty, astringent, chalky taste which is so prevalent with the prior less concentrated magma magnesia compositions.

A still further advantage of the concentrated milk of magnesia of this invention is that it eliminates the bulk dosage problem that has been objectionable with the commercially available milk of magnesia preparations. Whereas the prior milk of magnesia preparations required a dose of up to four tablespoonfuls for laxative effect the preparation of this invention requires only one to four teaspoonfuls or one third the amount to produce the same laxative effect.

The novel pharmaceutical preparation of this invention comprises an aqueous suspension comprising magnesium hydroxide, a suspending agent and submicroscopic silica. It has been unexpectedly discovered that the combination of a suspending agent and submicroscopic silica permits for a much higher concentration of magnesium hydroxide in an aqueous suspension than has previously been known without any evidence of clumping. Further, the submicroscopic silica and suspending agent combination prevents the formation of a cake at the bottom of the container thus insuring proper dosage by simple shaking before use.

By the term a high concentration is meant that the active ingredient, magnesium hydroxide is present up to at least 30% W/V. Preferably the magnesium hydroxide is present from about 10% to about 30%, most advantageously from about 15% to about 25% W/V.

The generic term "submicroscopic silica" is a submicroscopic pyrogenic silica prepared in a hot gaseous environment (110° C.) by the vapor phase hydrolysis of a silicon compound. This method of preparation results in a product different from other siliceous pigments prepared by aqueous precipitation processes. It is a very pure silicon dioxide characterized in that it is extremely fine, light in weight and having the appearance and fluffy texture of snow. Thus, it differs from silica gels, silica aerogels or other precipitated silicas. The submicroscopic silica is present in an amount of from about 0.1% to about 2% most advantageously is present from about 0.25% to about 1.0%. Submicroscopic silica is known under the trade name of Cab-o-Sil (Cabot Corporation).

The suspending agent may be any well known to the art, such as for example, tragacanth, acacia, cellulosic derivatives, Veegum (colloidal magnesium aluminum silicate—Vanderbilt Co.) and sodium alginate. Preferably the suspending agent will be a cellulosic derivative such as, for example, methyl cellulose and carboxymethylcellulose, most advantageously sodium carboxymethylcellulose, for instance, about 0.5% to about 1.5% of sodium carboxymethylcellulose. The suspending agent will be present up to about 2% by weight (W/V), preferably up to about 1%. Most advantageous results are obtained when sodium carboxymethylcellulose and the submicroscopic silica are present in a 2:1 ratio.

The preparations are made following the conventional techniques of the pharmaceutical chemist. When necessary any desired pharmaceutically compatible adjuvant used in liquid preparations by those skilled in the art may be employed. For example, preservatives such as methylparaben or propylparaben, flavoring agents such as oil of orange, lemon-lime flavors, cola flavors or the combination of these flavors or any solubilizing agent such as glycerin.

The novel pharmaceutical preparation of the present invention will be more readily understood from a consideration of the following specific example which is given for the purpose of illustration only and is not intended to limit the scope of the invention in any way.

EXAMPLE 1

| Ingredients: | Amount |
|---|---|
| Magnesium hydroxide, NF _____gm__ | 24.0 |
| Glycerin, USP _____ml__ | 10.0 |
| Methylparaben, USP _____gm__ | 0.0625 |
| Propylparaben, USP _____gm__ | 0.0125 |
| Sodium carboxymethylcellulose _____gm__ | 1.0 |
| Submicroscopic silicate* _____gm__ | 0.5 |
| Sugar syrup, USP _____ml__ | 14.0 |
| Imitation cola flavor _____ml__ | 0.1 |
| Soluble lemon-lime flavor _____ml__ | 0.03 |
| Purified water, USP q.s. _____ml__ | 100.00 |

*Chemical and physical properties of the submicroscopic silica (Cab-o-Sil): silica content (moisture-free basis), 99.0–99.7%; free moisture (105° C.), 0.1–1.5%; particle size range, 0.015–0.020 micron; surface area (nitrogen adsorption), 175–200 sq. m./gm.; specific gravity, 2.1; color, white; refractive index, 1.55; pH (4% aqueous dispersion)…

The magnesium hydroxide is added to a portion of water equivalent to 60% of the final volume until evenly dispersed. The sugar syrup is then added and mixed. The parabens are dissolved in the glycerin with the aid of heat and the submicroscopic silica and sodium carboxymethylcellulose added to the glycerin solution. The glycerin mixture is then added to the magnesium hydroxide-water-syrup mixture and stirred until evenly dispersed. The flavors are added and the suspension is brought to the desired volume by the addition of sufficient water and homogenized.

What is claimed is:

1. An oral liquid pharmaceutical preparation comprising an aqueous suspension comprising from about 10% to about 30% of magnesium hydroxide up to about 2% of a suspending agent selected from the group consisting of methyl cellulose, carboxymethylcellulose and sodium carboxymethylcellulose and from about 0.1% to about 2% of submicroscopic silica.

2. An oral liquid pharmaceutical preparation comprising an aqueous suspension comprising from about 15% to about 25% of magnesium hydroxide, from about 0.5% to about 1.5% of sodium carboxymethylcellulose and from about 0.25% to about 1.0% of submicroscopic silica.

3. A liquid pharmaceutical preparation for oral administration comprising an aqueous suspension having from about 10% to about 30% of magnesium hydroxide and up to about 2% of a suspending agent comprising colloidal magnesium aluminum silicate, sodium alginate, methyl cellulose, carboxymethylcellulose or sodium carboxymethylcellulose in combination with from about 0.1% to about 2.0% of submicroscopic silica.

References Cited

UNITED STATES PATENTS 2,477,080   7/1947   Necheles _____ 167—55

OTHER REFERENCES

The Condensed Chemical Dictionary, Reinhold, New York (1961), pp. 192, 1037.

SAM ROSEN, *Primary Examiner.*

ALBERT T. MYERS, *Examiner.*

S. J. SINGER, *Assistant Examiner.*